W. J. HIGGS.
PUNCTURE PROOF WHEEL.
APPLICATION FILED JAN. 27, 1915.
1,152,508.
Patented Sept. 7, 1915.
2 SHEETS—SHEET 1.
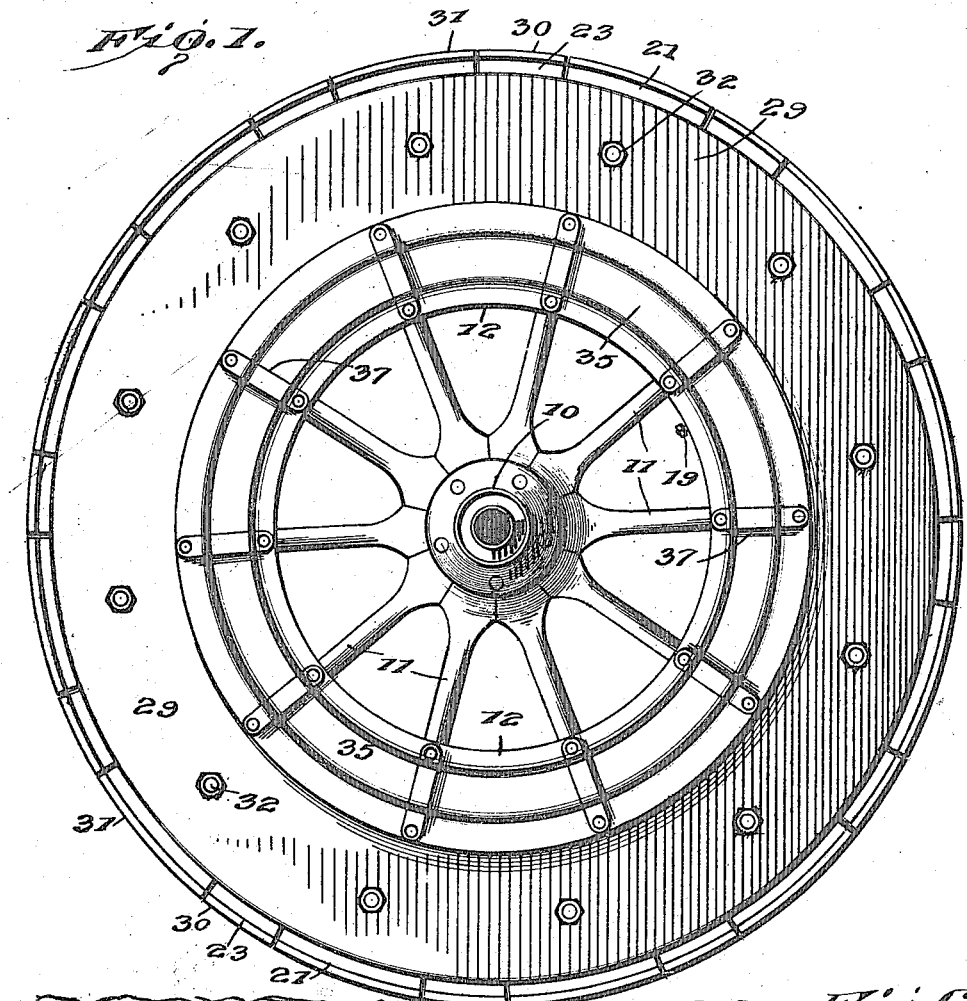
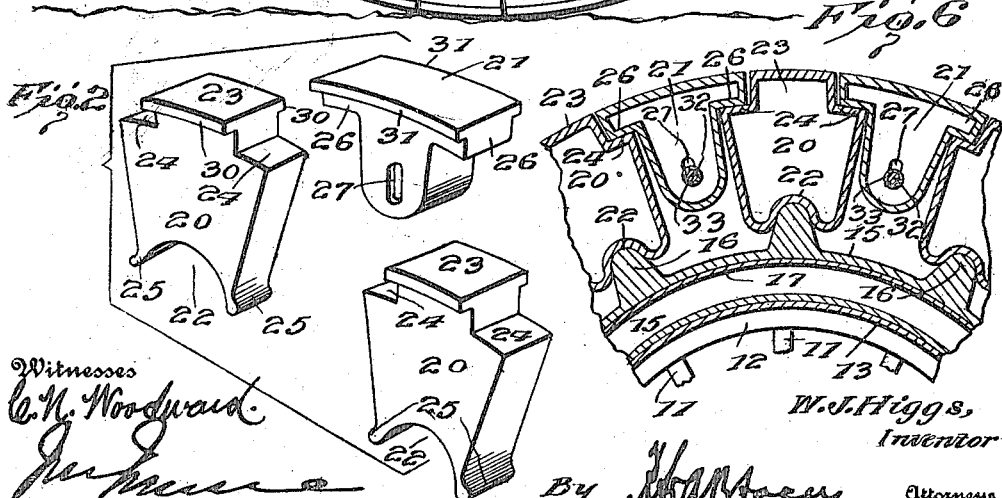
W. J. Higgs,
Inventor

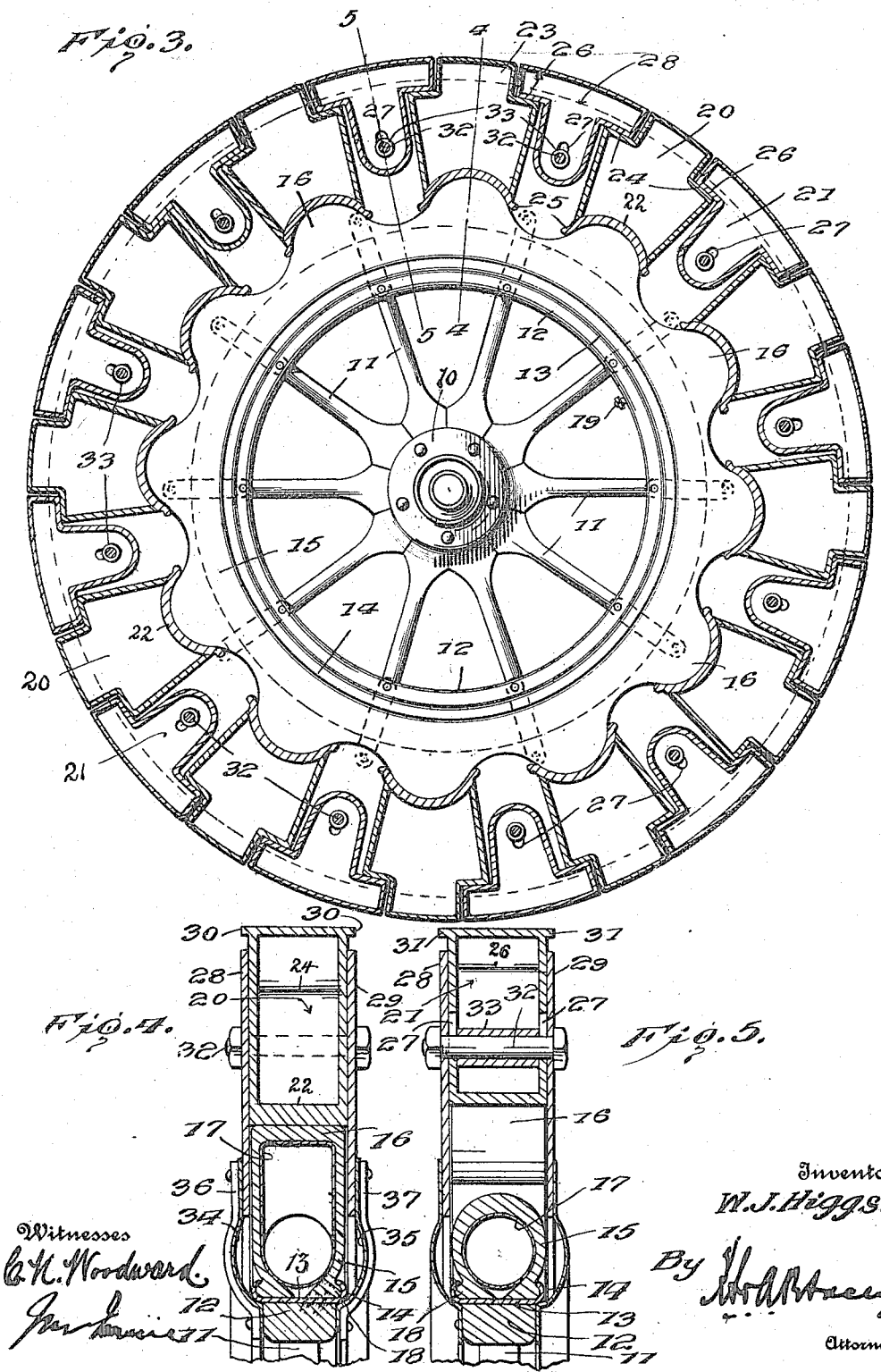

UNITED STATES PATENT OFFICE.

WALLACE J. HIGGS, OF LEHI, UTAH.

PUNCTURE-PROOF WHEEL.

1,152,508.

Specification of Letters Patent.  Patented Sept. 7, 1915.

Application filed January 27, 1915. Serial No. 4,731.

*To all whom it may concern:*

Be it known that I, WALLACE J. HIGGS, a citizen of the United States, residing at Lehi, in the county of Utah and State of Utah, have invented certain new and useful Improvements in Puncture-Proof Wheels, of which the following is a specification.

This invention relates to improvements in wheels of the class of yieldable wheels, and has for one of its objects to provide a simply constructed device whereby all the advantages of the ordinary pneumatic tire are retained without danger of puncture.

Another object of my invention is to provide a wheel having an inflatable inner tire and a plurality of bearing devices externally of the inflatable tire and arranged to interlock to prevent their peripheral displacement, while at the same time permitting any of the marginal units to be replaced when broken or impaired without disturbing the remainder of the wheel.

With these and other objects in view, the invention consists in certain novel features of construction as hereinafter shown and described and then specifically pointed out in the claims; and in the drawings illustrative of the preferred embodiment of the invention Figure 1 is a side elevation of the improved wheel; Fig. 2 represents perspective views of a plurality of marginal units illustrating their construction; Fig. 3 is a side elevation with the marginal units in section; Fig. 4 is an enlarged sectional view on the line 4—4 of Fig. 3; Fig. 5 is a sectional view on the line 5—5 of Fig. 3; Fig. 6 is a sectional detail illustrating a slight modification in the construction.

Corresponding and like parts are referred to in the following description and indicated in all the views of the drawings by the same reference characters.

The central or body portion of the wheel may be of any of the usual forms and includes a hub 10, spokes 11 and felly member 12. The felly member 12 is likewise provided with a rim 13 having inturned flanges 14 of the usual form employed upon wheels for supporting pneumatic tires of the usual construction.

In the improved device, an inflatable tire is employed and comprising a body portion 15 having outwardly directed enlargements 16 spaced at uniform distances apart as illustrated in Fig. 3. By this means, the outer face of the inflatable tire is corrugated in outline, or with outwardly directed projections at uniform distances apart. The interior of the tire including the projections 16 thus forms an annular air space, and the inflatable portion of the tire, indicated conventionally at 17, conforms to the interior shape of the inflatable tire. The inner portion 15 of the tire is provided with the usual clencher flanges 18 which are engaged in the usual manner by the inturned portions 14 of the rim 13, as shown in Figs. 4 and 5. The tire 15—16 is adapted to be inflated in the usual manner through the valve device 19.

Externally of the inflatable tires 15—16, a plurality of bearing units are employed and preferably constructed of hollow metal members. The bearing units are constructed in pairs and arranged in alternating relations. One set of the bearing units is indicated at 20 and the other set at 21. The inner ends of the bearing units 20 are hollow or curved inwardly as represented at 22 to respectively bear over the projecting portions 16 of the inflatable tire and are reduced at their outer ends as represented at 23, whereby lateral bearing shoulders 24 are formed near their outer ends. The terminals of the curved portion 22 of the bearing units 20 are extended to form laterally curving lips 25 which are rounded so that they will not cut into the relatively soft material of the inflatable tire. The bearing units 21 are rounded at their inner ends and engage between each pair of the bearing units 20 and are enlarged laterally at their outer ends as represented at 26 to form projections for bearing upon the shoulders 24 of the units 20. Each of the bearing units 21 is provided with vertically directed transverse slots 27 in their side faces, the object to be hereafter explained.

Bearing upon the outer faces of the united bearing units 20—21 are annular holding plates 28—29, the plates extending at their inner edges partially over the sides of the inflatable tire and spaced at their outer edges inwardly from the outer faces of the bearing units. The side edges of the outer ends of the bearing units are extended laterally as represented respectively at 30—31 to extend over the outer edges of the members 28—29, as illustrated in Figs. 4 and 5. By this means, the bearing units are free to move inwardly a distance equal to the space between the overhanging portions 30—31 and the outer edges of the members 28—29. Clamp bolts 32 are extended through the members 28—29 and likewise through the slots 27 of the bearing units 21, and a spacing sleeve 33 is located around each bolt 32 and extends between the inner side faces of the members 21. By this means, the members 28—29 are firmly coupled, while the members 21 are free to move inwardly within the range of the slots 27, and the sides of the members 21 are prevented from collapsing through the influence of the sleeves 33. The felly member 12 and the members 28—29 are coupled by flexible guard devices 34—35 to protect the inflatable tire. The members 28—29 and the felly 12 are connected at suitable intervals by straps 36—37, the straps corresponding preferably in numbers with the spokes 11, as shown.

The members 20—21 may be constructed of any suitable material and of any suitable weight, but will preferably be of hollow metal of sufficient strength to withstand the wear and friction to which they will be subjected when in use. The body portions of the members 21 will be spaced a sufficient distance from the contiguous faces of the members 20 to permit a certain degree of flexibility or movement between the parts to prevent cramping when in use.

By this arrangement, it will be obvious that in the event of breakage or impairment of one or more of the bearing units, the broken or impaired part may be readily removed by detaching the clamp bolts 32 and replacing the same with a perfect unit or units without disturbing the remainder of the wheel.

The improved device is simple in construction, can be inexpensively manufactured and adapted to vehicle wheels of various sizes, and employed for various purposes.

The improved wheel will be found especially useful under motor trucks and heavier grades of similar vehicles, but may be likewise readily adapted to automobiles of various forms.

Having thus described the invention, what is claimed as new is:

1. In a device of the class described, an inner wheel, an inflatable tire engaging said wheel, a plurality of bearing units spaced apart and engaging the said tire by their inner ends, a plurality of other bearing units interposed between the first mentioned bearing units and spaced at their inner ends from said inflatable tire, and means for limiting the outward movement of the interposed bearing units.

2. In a device of the class described, an inner wheel, an inflatable tire engaging said wheel and having outwardly directed projections spaced apart, a plurality of bearing units spaced apart and respectively engaging the projections of said tire by their inner ends, a plurality of other bearing units interposed between the first mentioned bearing units and spaced at their inner ends from said inflatable tire, and means for limiting the outward movement of said interposed bearing units.

3. In a device of the class described, an inner wheel, an inflatable tire engaging said wheel, a plurality of bearing units spaced apart and engaging tire by their inner ends, a plurality of other bearing units interposed between the first mentioned bearing units and spaced at their inner ends from said inflatable tire, annular members disposed at opposite sides of said bearing units, means for connecting said annular members to said inner wheel, and fastening devices movably coupling said interposed bearing units to said annular members.

4. In a device of the class described, an inner wheel, an inflatable tire engaging said wheel, a plurality of bearing units spaced apart and engaging said tire by their inner ends and each provided with lateral bearing shoulders, a plurality of other bearing units interposed between the first mentioned bearing units and having lateral projections engaging the bearing shoulders of the first mentioned bearing units and spaced at their inner ends from said inflatable tire, and means for limiting the outward movement of the interposed bearing units.

5. In a device of the class described, an inner wheel, an inflatable tire engaging said wheel, a plurality of bearing units spaced apart and engaging said tire by their inner ends and each provided with lateral bearing shoulders, a plurality of other bearing units interposed between the first mentioned bearing units and having lateral projections engaging the bearing shoulders of the first mentioned bearing units and spaced at their inner ends from said inflatable tire, annular members disposed at opposite sides of said bearing units, means for connecting said annular members to said inner wheel, and fastening devices movably coupling said interposed bearing units to said annular members.

6. In a device of the class described, an inner wheel, an inflatable tire engaging said wheel, a plurality of bearing units spaced apart and engaging said tire by their inner ends, a plurality of other bearing units interposed between the first mentioned bearing units and spaced at their inner ends from said inflatable tire, annular members disposed upon opposite sides of said bearing units, and a plurality of clips spaced apart and uniting said annular members to said inner wheel.

In testimony whereof I affix my signature in presence of two witnesses.

WALLACE J. HIGGS. [L. S.]

Witnesses:
   EDUARD SOUTHWICK,
   THOR CEDARSTROM.

Copies of this patent may be obtained for five cents each, by addressing the "Commissioner of Patents, Washington, D. C."